(12) United States Patent
Schniebel

(10) Patent No.: US 11,586,489 B2
(45) Date of Patent: Feb. 21, 2023

(54) AUTOMATED DISASTER RECOVERY TEST VERIFICATION

(71) Applicant: Sungard Availability Services, LP, Wayne, PA (US)

(72) Inventor: Michael Schniebel, Sugar Land, TX (US)

(73) Assignee: Sungard Availability Services, LP, Wayne, PA (US)

( * ) Notice: Subject to any disclaimer, the term of this patent is extended or adjusted under 35 U.S.C. 154(b) by 375 days.

(21) Appl. No.: 16/896,064

(22) Filed: Jun. 8, 2020

(65) Prior Publication Data

US 2021/0382771 A1 Dec. 9, 2021

(51) Int. Cl.
*G06F 9/455* (2018.01)
*G06F 11/07* (2006.01)

(52) U.S. Cl.
CPC ........ *G06F 11/079* (2013.01); *G06F 9/45558* (2013.01); *G06F 11/0712* (2013.01); *G06F 11/0751* (2013.01); *G06F 11/0772* (2013.01); *G06F 11/0793* (2013.01)

(58) Field of Classification Search
None
See application file for complete search history.

(56) References Cited

U.S. PATENT DOCUMENTS

| | | | | |
|---|---|---|---|---|
| 6,496,941 B1 * | 12/2002 | Segal | .................. | H04L 41/0654 714/4.2 |
| 7,480,822 B1 * | 1/2009 | Arbon | .................. | G06F 11/2038 714/13 |
| 8,402,309 B2 * | 3/2013 | Timashev | ........... | G06F 11/1448 714/15 |
| 8,700,946 B2 * | 4/2014 | Reddy | .................. | G06F 11/273 714/4.11 |
| 8,966,318 B1 | 2/2015 | Shah et al. | | |
| 9,021,294 B2 * | 4/2015 | Reddy | ................. | H04L 41/0659 714/4.11 |
| 9,208,006 B2 * | 12/2015 | Jones | ..................... | G06F 11/008 |
| 9,268,648 B1 * | 2/2016 | Barash | ................ | G06F 11/1446 |
| 10,210,079 B2 * | 2/2019 | Ray | ..................... | G06F 11/2025 |
| 10,310,949 B1 * | 6/2019 | Chakraborty | ......... | G06F 3/0683 |
| 10,481,988 B2 * | 11/2019 | Mamluk | ............. | G06F 11/2094 |

(Continued)

OTHER PUBLICATIONS

Alhazmi et al. "Evaluating Disaster Recovery Plans Using the Cloud", 2013 IEEE, 6 pages.*

(Continued)

*Primary Examiner* — Van H Nguyen
(74) *Attorney, Agent, or Firm* — David J. Thibodeau, Jr.; VLP Law Group, LLP

(57) ABSTRACT

A Disaster Recovery (DR) verification process or system verifies readiness to execute a Disaster Recovery (DR) test. Such DR verification is automatically provided on a regular basis, with minimum impact on both a production and recovery environment. However, DR verification is only enabled at a time when no disaster recovery or DR testing of other sites is already under way. Configuration data needed for DR verification is constantly replicated from production to recovery, by dedicated data movers. DR verification allocates and configures recovery resources in an encapsulated environment, confirms successful their instantiation (such as boot up and network connections), and reports the outcome.

20 Claims, 3 Drawing Sheets

(56) References Cited

U.S. PATENT DOCUMENTS

| | | | | |
|---|---|---|---|---|
| 10,977,274 | B2* | 4/2021 | Manvar | G06F 16/27 |
| 11,263,082 | B2* | 3/2022 | Rakesh | G06F 11/1415 |
| 11,288,150 | B2* | 3/2022 | Thaker | G06F 11/2215 |
| 2014/0325267 | A1 | 10/2014 | Liu et al. | |
| 2018/0276019 | A1 | 9/2018 | Ali et al. | |

OTHER PUBLICATIONS

Xu et al. "A Consistent Backup Mechanism for Disaster Recovery that Using Container Based Virtualization", 2012 IEEE, pp. 95-100.*

International Search Report and Written Opinion dated Sep. 22, 2021 in Related PCT/US2021/35582.

Https://www.unitrends.com/blog/part-3-recovery-assurance-windows-recovery-series-unitrends-enterprise-backup-9-0; "(Part 3—Recovery Assurance for Windows) Recovery Series and Unitrends Enterprise Backup 9.0"; (Accessed Apr. 16, 2020).

Https://www.unitrends.com/features/disaster-recovery-testing; Disaster Recovery Testing—Recovery Series Backup Appliances—Unitrends; Accessed Apr. 16, 2020).

"Zerto Cloud Manager Administration Guide Cloud Environments," Zerto Cloud Manager Administration Guide Cloud Environments—Rev02, pp. 1-168 (2020).

"Zerto Live Disaster Recovery Testing in vSphere Environments," Rev02, pp. 1-32 pages (2020).

Https://www.unitrends.com/blog/part-3-recovery-assurance-windows-recovery-series-unitrends-enterp rise-backup-9-0; "(Part 3—Recovery Assurance for Windows) Recovery Series and Unitrends Enterprise Backup 9.0"; Oct. 27, 2015, (Accessed Apr. 16, 2020).

Https://www.unitrends.com/features/disaster-recovery-testing; Disaster Recovery Testing—Recovery Series Backup Appliances—Unitrends; Jul. 10, 2017 (Accessed Apr. 16, 2020).

"Unitrends Recovery Assurance Automated Failover, DR Testing, and Compliance Reporting—Locally and in the Cloud," Datasheet, Unitrends Recovery Assurance (2020) (Accessed Apr. 16, 2020).

Paul, Justin, "Zerto Cloud Service Provider How to—Part 1 Architecture"; pp. 1-5, Posted Oct. 19, 2016 (Accessed May 1, 2020).

Paul, Justin, "Zerto Cloud Service Provider How to—Part 2 Zerto Components"; pp. 1-7, Posted Oct. 19, 2016 (Accessed May 1, 2020).

Paul, Justin, "Zerto Cloud Service Provider How to—Part 3 Networking"; pp. 1-6, Posted Oct. 19, 2016 (Accessed May 1, 2020).

* cited by examiner 350 scheduler triggers (~ every 30 days)

360 check for conflicts with:
361 scheduled customer DR tests / UATs
362 declared disasters
363 resource conflicts 370 If no conflicts, then run DR Verify
371 data mover status?
372 boot VMs?
373 networks operational?
375 collect "screenshots"
376 application status 380 generate report
381 re-execute on failure
382 check RTO against SLA

Fig. 3

AUTOMATED DISASTER RECOVERY TEST VERIFICATION

BACKGROUND

This patent application relates to information technology, and in particular to replication and recovery techniques.

Recovering a set of Information Technology (IT) systems can become a relatively complex task. This is due at least in part to the fact that the underlying infrastructure it not always implemented with disaster recovery in mind. Disaster recovery solutions may not even be implemented at all, even where business criticality would otherwise dictate the necessity of such solutions.

One common disaster recovery approach protects the individual data processing systems. These operate by capturing state information from a protected production system, and then re-creating the system state on a recovery system. In the case of a disaster event, this approach can bring up that recovery system in the desired state.

Disaster recovery operations are, in many installations, a primarily manual operation. For highly virtualized environments and cloud-based applications, some vendors provide available tools that leverage automation procedures. However, those solutions are often tied to particular vendors. In addition, a large portion of enterprise IT is still not virtualized. For such environments, the only option is to manually code recovery procedures for each and every application in each and every data center scenario. This becomes a very labor-intensive, time-consuming and error-prone process.

In other instances, different vendor solutions are chosen depending upon specific implementation needs for certain critical subsystems, such as storage. However, this approach can also require much manual intervention to choose the right replication solution and to ensure it remains operational when configurations change.

As Information Technology (IT) systems have become increasingly critical to the smooth operation of an organization, and arguably the economy as a whole, the importance of ensuring continued operation and rapid recovery of those systems has increased. Preparation for recovery of systems involves a significant investment of time and money, with the aim of ensuring minimal loss in the event of a disruptive event.

Prior to selecting a disaster recovery (DR) strategy, a disaster recovery administrator first refers to their organization's business continuity plan which may indicate expected metrics such as a Recovery Point Objective (RPO) or Recovery Time Objective (RTO) for various IT functions (such as payroll, order processing, accounting, manufacturing, etc.). These metrics are then mapped to the underlying systems and infrastructure that support those functions. The DR planner can determine the most suitable recovery strategy for each system.

In many cases, an organization may elect to use an outsourced disaster recovery service provider to provide a stand-by site and systems, rather than using their own facilities, increasingly via cloud computing.

It is often the case that planning for disaster recovery is thus coordinated between an organization's responsible administrator(s) and the outside service provider. These disaster recovery plans are often expensive to devise. It can become difficult for the personnel on both sides, the customer and the service provider, to keep up with rapidly changing computing environments.

In one approach, a database can store information on available resources such as replication technologies for implementing disaster recovery plans. The database can include information concerning infrastructure and best practices that should be observed when implementing the disaster recovery plan.

SUMMARY OF PREFERRED EMBODIMENTS

Without periodic testing, many things can go wrong with a disaster recovery solution, leaving critical assets vulnerable. Despite rising cyber threats and growing business reliance on IT operations, testing for recoverability in advance of an actual disaster is still not performed frequently or thoroughly enough. Such DR testing is seen as requiring significant effort, requiring otherwise productive computing assets to be taken off line, and personnel to be diverted from more important things. It is thus viewed as a time-consuming, expensive, and low-value activity.

When DR tests are finally considered important enough to run, they often fail. Failures may be caused because configuration data is not properly replicated, disks have become corrupted, operating system or application images have now been updated, dependencies among resources have not been fully addressed as a result recent configuration change, or the available recovery resources may become insufficient over time.

Regular disaster recovery testing can expose problems in the recovery plan, replicated configuration data, and production environment resource allocation, prior to an actual disaster. However, despite with guidance from an outside service provider who specializes in disaster recovery, a given production environment may simply not yet be ready for even executing a test of a disaster recovery process, never mind being ready to successfully accomplish an actual recovery.

The novel approach described herein is for a Disaster Recovery (DR) service to verify the readiness of an IT environment to execute a Disaster Recovery (DR) test. Such "DR test readiness" verification is seamlessly and automatically provided on a regular basis. It is accomplished in a way that has minimum impact on both the production environment and the DR service provider.

In a preferred process or system, configuration and other data needed for DR verification is constantly replicated from a production environment to a recovery environment. The replication is performed by data movers dedicated to the DR verification task, so that there minimal impact on the production environment.

DR verification is also scheduled to avoid conflicts with the service provider's ongoing actual disaster recovery operations, other scheduled DR testing, or other higher priority tasks. At a time when no such conflicts exist, typically on some regular basis when possible, the DR verification process is permitted to proceed. DR verification then allocates and configures the needed recovery resources in an encapsulated environment, confirms successful instantiation of the resources (such as boot up and network connections), and reports the outcome.

In one example implementation, a method for verifying readiness for a recovery environment to provide Disaster Recovery (DR) testing services to a production environment is provided. The production environment includes
  (a) a set of protected virtual machines (VMs), and
  (b) a data mover for replicating VM configuration and content data to to the recovery environment.

The production-side data mover operates continuously, is dedicated exclusively to this recovery environment replication task, and preferably operates independently of other data mover or backup tasks in the production environment.

The recovery environment includes (c) a set of recovery VMs;

(d) a recovery data mover component, for receiving and storing the configuration and content data of the protected VMs;

(e) an operations database maintaining operations data for the recovery environment and (f) at a scheduler process and a DR verification process.

The scheduler process determines a schedule based on the availability of VMs and other resources in the recovery environment, taking into account ongoing disaster recovery or DR testing that have higher priority.

The DR verification process, at a time set according to the schedule, is for (g) providing access for the recovery VMs to the stored configuration and content data;

(h) booting the recovery VMs;

(i) provisioning network resources for use by the recovery VMs; and (j) verifying that (g)-(j) were successful.

DR verification may also track the time it took to successfully complete its tasks. Subsequent steps may involve comparing the measured DR verification time against a Recovery Time Objective (RTO).

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a flow for an example DR Verification process.

DETAILED DESCRIPTION OF A PREFERRED EMBODIMENT

In particular implementations, readiness to execute a Disaster Recovery (DR) test, which we refer to herein as DR verification, is determined in a way that is as seamless as possible for the customers of a Disaster Recovery (DR) service.

DR verification automatically executes a process that estimates the ability (or readiness) of the disaster recovery service to successfully complete a failover test. DR verification may execute on a regular basis, such as once a month, with no need for human interaction by either the DR service provider or its customers.

DR verification performs some predefined subset of operations that are specified in a related, full DR test process. For example, DR verification may check for availability of computing resources in a recovery environment, and then attempt to boot the specified Virtual Machines (VMs). DR verification may be designed to expose data corruptions or configuration issues that are only exposed on boot up (such as storage content or mappings, Windows registry errors, etc.) Before the DR verification process is triggered, there has been continuous replication of configuration data from the production to the recover environment. This permits DR verification to proceed without impacting normal operation of the production environment in any way. DR verification does not perform a full DR test.

In a case where DR verification exposes problems, it can be automatically scheduled to repeat at a later time, to determine if the DR verification failure was an anomaly, or a more permanent problem.

By automating the execution of at least a DR verification, reliability of a successful recovery is improved.

The data mover component(s) responsible for replicating data needed for DR verification is independent of any customer-specific DR, data backup or other technologies.

Figure 1:
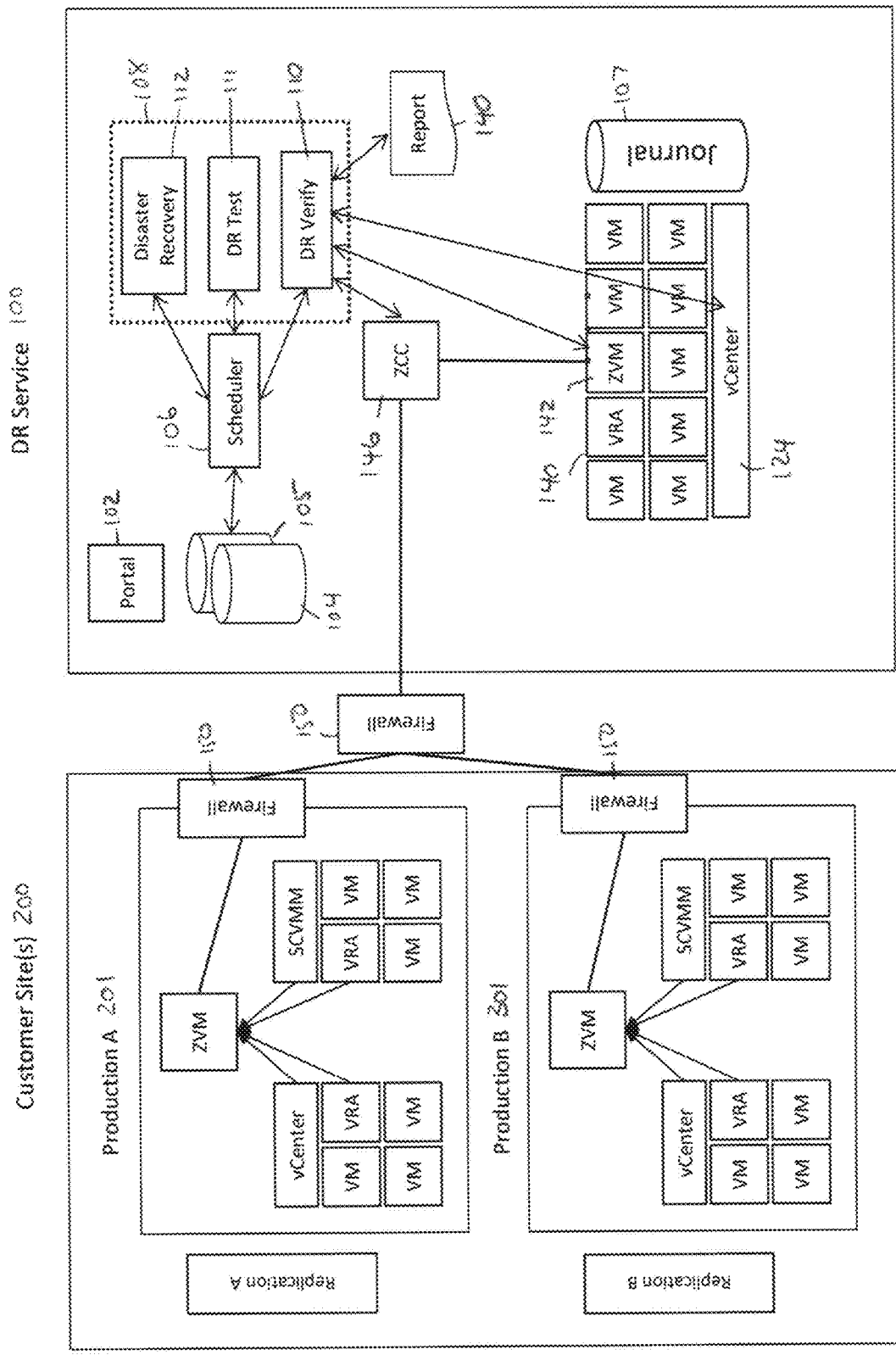
FIG. 1 illustrates a Disaster Recovery (DR) service that provides DR Verification to multiple customers who each operate a production data processing environment.

Turning attention to FIG. 1, an example Disaster Recovery (DR) service 100 is accessed by one or more customers 200 that operate one or more customer production data centers 201 and 301. Although only two production data centers 201 and 301 are shown, it should be understood that the DR service 100 typically provides services to many more production data centers.

The DR service 100 includes a number of sub-systems including a Customer Portal 102, a Configuration Management Database (CMDB) 104, a Resource Inventory Database 105, a Scheduler 106, and Journal Database 107.

One or more execution engines 108 (also referred to as "executors") operate processes that provide various aspects of the Disaster Recovery Service 100, including a DR Verification process (DR Verify) 110, a DR Test process 111, and Disaster Recovery Execution process 112.

The Disaster Recovery process 112 is responsible for executing an actual recovery of customer production systems 201 that have experienced a disaster or have otherwise failed.

The DR Test process 111 often occurs prior to Disaster Recovery 112, as a way to confirm that the DR service 100 can be expected to successfully recover a production system 201 or 301 if it were to fail. DR Test 111 typically involves temporarily interrupting, disabling or removing one or more systems, components, or features of the production environment 201 or 301, and observing how the DR service 100 performs.

Finally, the DR Verify process 110 is a vehicle for the DR service 100 provider to obtain some comfort that a successful DR Test 111 is expected to be possible. DR Verify 110 is preferably performed on some regular basis, without interrupting, disabling, or removing the components needed for normal operation of the customer production systems 201, 301.

More particularly, an example production 201 environment includes a number of data processing sub-systems such as virtual machines (VMs) 202 and associated hypervisors 203. Such hypervisors here include VMware's vCenter or Microsoft's System Center Virtual Machine Manager (SCVMM), although other configurations are possible.

Customer 201 also operates or accesses a data replication sub-system 205 to provide data backup and/or data protection for the VMs 202. As will be explained in detail below, the replication sub-system is independent of, and is not accessed by, the DR Verify 110 process.

Each of these sub-systems within the DR service 100 and customer production sites 201, 301 includes one or more physical or virtual data processors, with storage for programs and data, user input and output devices, networking and security devices, and/or other data processing system components or features. The various sub-systems are also enabled to communicate with one another over various network connections.

Returning attention to the DR service 100, the Customer Service Portal 102 is a user interface for the customers 200 of the DR Service 100. The portal 102 permits customers to specify, schedule and monitor the status of DR Tests 111, declare disasters to invoke the Disaster Recovery Execution System 112, and other functions.

The Scheduler 106 serves as a vehicle for the DR service 100 to plan the allocation of recovery resources 120 to the DR Verify 110, DR Test 111, and Disaster Recovery 112 processes. The resources 120 needed to provide the Disaster Recovery 112 may include hardware infrastructure elements such as physical data processors, networking devices, and storage systems, virtual machines (VMs), virtual networks (VLANs), cloud storage, as well as human resources such as IT personnel needed to configure, maintain and operate these resources. It should be understood that the DR service 100 may permit the customers 200 to specify the configuration settings for these recovery resources. In other instances, the configurable items may permit the customer to install or configure operating systems or other software. It should also be understood that the various data processors may include virtualized platforms.

Of particular interest here is that the recovery resources 120 made available to the production data centers 201, 301 during operation of the DR Verify process 110 typically include virtual machines (VMs) 122, associated hypervisor(s) 124, and virtual networks (VLANs) 126.

The DR Test 111 and Disaster Recovery processes 112 may be any known processes, and often require some level of human involvement to execute a plan. However, they may also take advantage of programmatic DR plan workflows, such as described in U.S. Pat. No. 9,836,365 entitled "Recovery Execution System Using Programmatic Generation of Actionable Workflows" and U.S. Pat. No. 10,210,079 entitled "Touch Free Disaster Recovery", each assigned to Sungard Availability Services LP, and for which the entire contents are each hereby incorporated by reference.

DR Verify Components and Operation

Additional components in the DR service 100 and customer production environments 201, 301 are dedicated to the DR verify process 110. These include data protection components that continuously collect data from the customer environments 201, 301 and replicate them to corresponding components on the DR service 100 side. One particular implementation for the data mover uses components provided by Zerto, Inc. of Boston Mass.

For example, Zerto Virtual Replication Appliances (VRAs) 240 are virtual machines responsible for the actual data replication, including collecting the configuration and content data as it is created, modified, or deleted, and compressing and sending such data to a corresponding VRA 140 on the DR service site 101.

Zerto Virtual Manager (ZVM) components 242, 142 integrate with the hypervisors and deploy and manage the VRAs on each side. They handle all interaction with vCenter, SCVMM or other hypervisors.

A Zerto Cloud Connection (ZCC) component is a pairing target for the ZVM instances. It is responsible for enforcing security between customer VRAs and the VLANs on the disaster recovery side, such as via connections secured through firewalls 150, thus avoiding the need for direct ZVM to ZVM pairing.

Figure 2:
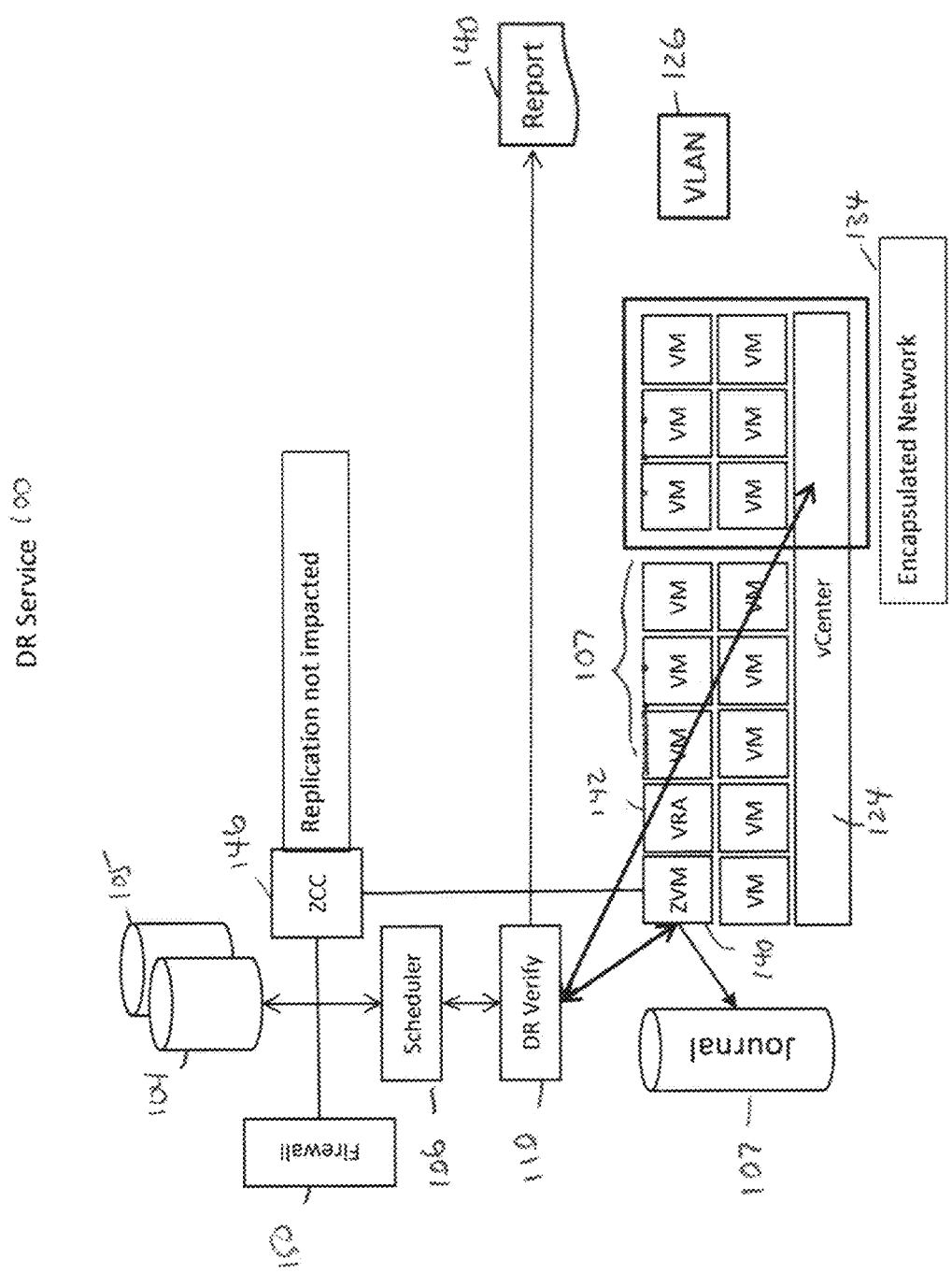
FIG. 2 shows the components of the DR service in more detail.

FIG. 2 illustrates the arrangement and operation of DR Verify 110 in more detail. The scheduler 106 is responsible for confirming times when it is appropriate for DR Verify to run. As alluded to above, the customers 200 do not define these times; instead, that is under control of the DR service provider 100. In one example implementation, DR Verify attempts to runs approximately once per month for each production environment 201, 301. However, this schedule is not fixed and also must takes into account other consideration on the DR service side. This typically includes whether DR tests 111 are scheduled for these or other customers, or even actual Disaster Recovery 112 is currently under way for other customers (each of which take higher priority for access to the recovery resources 107).

DR Verify 110 then runs when the scheduler 106 determines an appropriate time to do so. DR Verify 110 is responsible for several tasks, such as confirming that the data mover reports successful replication on the recovery site, and that a sufficient subset 130 of the recovery resources 107 can be configured. DR Verify thus performs some subset of the complete failover test that might be performed by a full DR Test 111. One way of determining which functions are appropriate for DR Verify 11 is to consider that such functions should not require any involvement of any of the resources on the customer production site. Thus a simple DR Verify may be to check whether each of the needed VMs in the encapsulated network successfully boot, and reports an operating network connection. As it completes its operation DR Verify generates a report 138.

FIG. 3 shows an example DR Verify process in more detail.

In step 350, the scheduler 106 tries to trigger DR verify 110 on a regular basis (e.g., every 30 days). To accomplish this, the scheduler 106 will check for conflicts with other scheduled operations, such as any scheduled DR tests 111, or currently ongoing disaster recoveries 112. Scheduler 106 may also consult the configuration 104 and/or resource inventory databases 105 to confirm there are no other conflicts to ensure and that the DR Verify will have all the necessary resources to bring the encapsulated environment 132 on line.

An important consideration is thus whether a disaster has been declared for any customer of the DR service 100, and not just the particular customer 201 whose time has come to perform DRVerify. Thus, the scheduler accounts for all possible current demands on the DR service and not just the one customer for which DR Verify is scheduled. This is to avoid diverting resources away from handling an actual disaster 112 that might be underway for customer B 301, to simply perform a lesser priority DR Verify 110 for customer A 201.

In this example, step 362 thus check for conflicts with scheduled DR tests 111. Step 363 checks for conflicts with declared disasters 112 that are currently operating, and step 364 then checks for other resource conflicts. If no conflicts are found, then in step 370 DR Verify 110 may proceed.

DR Verify then proceeds as follows. Step 371 may communicate with the data mover component(s) to determine whether data has been successfully replicating from customer site 201. If the data mover is Zerto, this may be accomplished with an Application Programming Interface (API) call to the ZCC.

Step 372 then may contact the hypervisor(s) (e.g., vCenter 124) via their respective APIs to request boot up of the various VMs and confirm they are successfully running their respective operating systems. If this is the case, then DR Verify 110 knows that it now has access the data it would needs to try a DR test 111.

State 373 may consult network infrastructure such as an API to a VLAN manager 126 to request connections, and then determine if the necessary network resources such as VLANs are correctly configured in the encapsulated environment 132.

Step 375, which may be an optional step, captures a login screen for each booted VM. The captured screens may be part of a report 138 assist with diagnosing a DR Verify failure.

Step 376, another optional step, may determine whether one or more applications are properly started on each VM. This could be determined by API calls to the applications.

Step 380 then generates a report. The report may include a status for the booted VMs, but also whether or not a Recovery Time Objective (RTO) was met. This can then enable the service provider to know how fast the production site was recovered on the recovery side. In step 382 this can be compared against a Service Level Agreement (SLA) for the customer 201. If the SLA was not met, then remedial action may be taken in step 383—perhaps even before the customer is aware of the failure to meet the RTO.

In other instances, if the DR Verify has failed at a certain rate, a retry can be scheduled for a time closer than the regular scheduled "every 30 days", such as the next day. This can enable the DR service team to more quickly take action to see if the problem can be addressed.

The above example is for a cloud-based DR service 100, where the protected resources are virtual machines. However, an analogous DR verify process can also be applied to protect physical resources on the production side 201 or 301. In this scenario, the data mover components 146, 242, etc. should be enabled to replicate necessary configuration data for such physical machines to the DR service 100. DR Verify 110 should also have access to an API or other interface to query the operational status of any corresponding recovery hardware resources on the recovery site 100.

Advantages

A number of advantages of this approach are now evident.

It provides scheduled, conflict-free, automatic verification of DR Test readiness. There is no involvement of personnel on either the customer production environment or within the DR service environment to have the DR verify operate on a regular basis.

DR verify has no impact to operations on the customer side. This include no impact to replication processes on the customer side, since DR Verify leverages data mover components that are dedicated to its task only.

Data processing environments constantly evolve on a daily basis. These changes can result in dependencies that would otherwise cause a DR test to fail. This can include corruption of storage resources (disks), misconfigured VMs or operating systems (windows registry), missing network resources. Regular operation of DR Verify can expose these vulnerabilities.

With the DR Verify approach described herein, the DR service provider can now verify that an SLA can be met on an ongoing basis, and take action if the DRverify indicates RTO is below what the SLA promises. This is done without involvement from the customer.

The solution is scalable to handle hundreds or even thousands of customer VMs.

The customer can continue to also schedule an actual DR test with the service provider as in the past. But here, the customer and/or service provider may first want to consider checking prior DR Verify reports before running a DR Test. In that way, of the DR Verify reported any problems, these can possibly be addressed before the DR Test takes place. Since any DR Test interrupts normal operation of the production side, this approach may avoid unnecessary downtime on the production systems.

Implementation Variations

The foregoing description of example embodiments illustrates and describes systems and methods for implementing novel features of a Disaster Recovery service. However, it is not intended to be exhaustive or limited to the precise form disclosed.

The embodiments described above may be implemented in many different ways. In some instances, the various "data processing systems" may each be implemented by a separate or shared physical or virtual general purpose computer having a central processor, memory, disk or other mass storage, communication interface(s), input/output (I/O) device(s), and other peripherals. The general purpose computer is transformed into the processors with improved functionality, and executes the processes described above to provide improved operations. The processors may operate, for example, by loading software instructions, and then executing the instructions to carry out the functions described.

As is known in the art, such a computer may contain a system bus, where a bus is a set of hardware wired connections used for data transfer among the components of a computer or processing system. The bus or busses are shared conduit(s) that connect different elements of the computer system (e.g., processor, disk storage, memory, input/output ports, network ports, etc.) to enables the transfer of information. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing. By aggregating demand from multiple users in central locations, cloud computing environments can be built in data centers that use the best and newest technology, located in the sustainable and/or centralized locations and designed to achieve the greatest per-unit efficiency possible.

Although certain data processing systems, such as the recovery data processing systems, are described as providing a "service" to the "customers" that operate production data processing systems, it should be understood that the recovery systems and production systems may be operated as part of the same enterprise, college campus, research institution, etc., where there are no actual human or corporate "customers" that pay money to access a "service".

Furthermore, firmware, software, routines, or instructions may be described herein as performing certain actions and/or functions. It also should be understood that the block and network diagrams may include more or fewer elements, be arranged differently, or be represented differently. Therefore, it will be appreciated that such descriptions contained herein are merely for convenience and that such actions in fact result from computing devices, processors, controllers, or other devices executing the firmware, software, routines, instructions, etc.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, firmware, or a combination thereof. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Headings and/or subheadings herein are used to segment this patent application into portions to facilitate the readability of the application. These headings and/or subheadings are not intended to define or limit the scope of what is disclosed and/or claimed in this patent application.

Also, the term "user", as used herein, is intended to be broadly interpreted to include, for example, a computer or data processing system or a human user of a computer or data processing system, unless otherwise stated.

The above description contains several example embodiments. It should be understood that while a particular feature may have been disclosed above with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skill in the art may now, in light of the above description, recognize that many further combinations and permutations are possible. Also, to the extent that the terms "includes," and "including" and variants thereof are used in either the detailed description or the claims, these terms are intended to be inclusive in a manner similar to the term "comprising".

Accordingly, the subject matter covered by this patent is intended to embrace all such alterations, modifications, equivalents, and variations that fall within the spirit and scope of the claims that follow.

The invention claimed is:

1. A method for verifying readiness for a recovery environment to execute a Disaster Recovery (DR) test of a production environment, the method executing on one or more data processors that access program code to:
provide the production environment comprising:
one or more protected virtual machines (VMs),
a production data mover component, for replicating configuration and content data for the one or more protected VMs to the recovery environment, the production data mover component operating continuously during normal operation mode of the production environment,
the data mover component dedicated exclusively to this recovery environment replication task and thus operating independently of other data mover or backup tasks in the production environment;
provide the recovery environment comprising:
one or more recovery VMs;
a recovery data mover component, for receiving and storing the configuration and content data of the one or more protected VMs;
an operations database maintaining operations data for the recovery environment, the operations data including operations other than DR verify;
and the method further comprising:
executing a scheduler process, for:
determining a schedule for running a DR verify process, based on availability of the one or more recovery VMs and other resources in the recovery environment, and not being based on any current operational mode of the production environment or availability of production resources therein;
executing a DR verification process, for:
at a time set according to the schedule:
providing access to selected ones of the one or more recovery VMs to the stored configuration and content data;
verifying successful boot of the selected one or more recovery VMs;
provisioning network resources for use by the selected one or more recovery VMs;
determining a recovery time needed to boot the selected ones of the recovery VMs and provision the other recovery resources; and
reporting the recovery time.

2. The method of claim 1 wherein the DR verification process further comprises a predefined subset of operations specified by the DR test.

3. The method of claim 1 additionally comprising:
comparing the recovery time against a Recovery Time Objective (RTO) for the production environment.

4. The method of claim 1 comprising two or more production environments, and the data mover components further comprise:
- a virtual recovery appliance associated with each set of protected VMs for a given production environment;
- a virtual recovery appliance associated with one or more of the recovery VMs;
- a virtual data mover manager, for configurating and controlling the virtual recovery appliances.

5. The method of claim 4 wherein the schedule additionally includes two or more times for different ones of the respective production environments, and additionally comprising:
- determining recovery times for each respective production environment; and
- comparing the recovery times against a Recovery Time Objective (RTO) for each respective production environment.

6. The method of claim 1 wherein at the time of execution of the DR verification process, further direct access to data in the production environment is not provided during successful boot of the selected one or more recovery VMs.

7. The method of claim 1 wherein a hypervisor performs the step of verifying whether the VMs booted correctly.

8. The method of claim 1 wherein one or more of the data mover components operate with different types of hypervisors.

9. The method of claim 1 wherein determining the schedule further comprises:
- determining whether disaster recovery or DR testing is currently being performed for other production environments, and if so, then not proceeding with the DR verification.

10. The method of claim 1 wherein the selected one or more recovery VMs are arranged in an encapsulated environment dedicated to the DR verification.

11. A system for verifying readiness for a recovery environment to execute a Disaster Recovery (DR) test of a production environment, the system comprising one or more processors configured to execute program code stored in one or more memories, the program code for further providing:
- the production environment comprising:
  - one or more protected virtual machines (VMs),
  - a production data mover component, for replicating configuration and content data for the one or more protected VMs to the recovery environment, the production data mover component operating continuously during normal operation mode of the production environment,
  - the data mover component dedicated exclusively to this recovery environment replication task and thus operating independently of other data mover or backup tasks in the production environment;
- the recovery environment comprising:
  - one or more recovery VMs;
  - a recovery data mover component, for receiving and storing the configuration and content data of the one or more protected VMs;
  - an operations database maintaining operations data for the recovery environment, the operations data including operations other than DR verify;
  - a scheduler process, for:
    - determining a schedule for running a DR verify process, based on availability of the one or more recovery VMs and other resources in the recovery environment, and not being based on any current operational mode of the production environment or availability of production resources therein;
  - a DR verification process, for:
    - at a time set according to the schedule:
      - providing access to selected ones of the one or more recovery VMs to the stored configuration and content data;
      - verifying successful boot of the selected one or more recovery VMs;
      - provisioning network resources for use by the selected recovery VMs;
      - determining a recovery time needed to boot the selected one or more recovery VMs and provision the other recovery resources; and
      - reporting the recovery time.

12. The system of claim 11 wherein the DR verification process further comprises a predefined subset of operations specified by the DR test.

13. The system of claim 11 additionally comprising:
- comparing the recovery time against a Recovery Time Objective (RTO) for the production environment.

14. The system of claim 11 comprising two or more production environments, and the data mover components further comprise:
- a virtual recovery appliance associated with each set of protected VMs for a given production environment;
- a virtual recovery appliance associated with one or more of the recovery VMs;
- a virtual data mover manager, for configurating and controlling the virtual recovery appliances.

15. The system of claim 14 wherein the schedule additionally includes two or more times for different ones of the respective production environments, and additionally comprising:
- determining recovery times for each respective production environment; and
- comparing the recovery times against a Recovery Time Objective (RTO) for each respective production environment.

16. The system of claim 11 wherein at the time of execution of the DR verification process, further direct access to data in the production environment is not provided during successful boot of the selected one or more recovery VMs.

17. The system of claim 11 wherein a hypervisor performs the step of verifying whether the VMs booted correctly.

18. The system of claim 11 wherein one or more of the data mover components operate with different types of hypervisors.

19. The system of claim 11 wherein determining the schedule further comprises:
- determining whether disaster recovery or DR testing is currently being performed for other production environments, and if so, then not proceeding with the DR verification.

20. The system of claim 11 wherein the selected one or more recovery VMs are arranged in an encapsulated environment dedicated to the DR verification.

* * * * *